Jan. 12, 1926.

A. G. BURT

DOG MAT

Filed August 29, 1924

1,569,710

Arthur G. Burt,
Inventor

By Clarence A. O'Brien
Attorney

Patented Jan. 12, 1926.

1,569,710

UNITED STATES PATENT OFFICE.

ARTHUR G. BURT, OF BALTIMORE, MARYLAND.

DOG MAT.

Application filed August 29, 1924. Serial No. 734,918.

*To all whom it may concern:*

Be it known that I, ARTHUR G. BURT, a citizen of the United States, residing at Baltimore, in the city of Baltimore and State of Maryland, have invented certain new and useful Improvements in a Dog Mat, of which the following is a specification.

This invention relates to a mat which is principally adapted for use by animals and is more particularly adapted for use by dogs.

One of the important objects of the present invention is to provide a dog mat of the above mentioned character, which will provide a means whereby a dog may rest thereupon, means being further provided in connection with the mat for exterminating the insects such as fleas which may be on the body of the dog lying on the mat.

A further object of the invention is to provide a dog mat of the above mentioned character, wherein the same is of such construction to include a head rest for the dog while the animal occupies the same, thus providing a maximum amount of comfort while the animal is resting or sleeping on the mat.

A further object of the invention is to provide a dog mat of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this application and in which like numerals designate like parts throughout the same:

Figure 1:
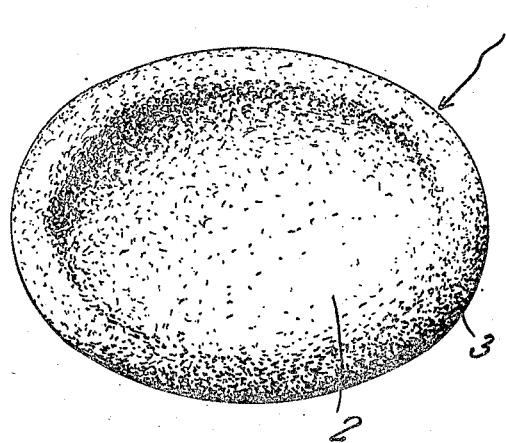
Figure 1 is a top plan view of the dog mat embodying the present invention.
Figure 2:
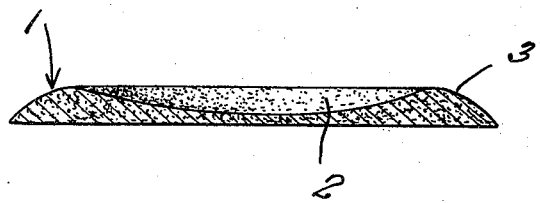
Figure 2 is a longitudinal sectional view thereof.

In the drawing wherein for the purpose of illustration is shown the preferred embodiment of my invention, the numeral 1 designates generally my improved dog mat, the same being in the form of a substantially oval pad, as is clearly illustrated in Figure 1. The mat is formed of any suitable absorbent or porous material, but is more particularly adapted to be formed of chenille.

The upper surface of the dog mat is concaved for its greater area as is clearly illustrated at 2. The edge which extends around the concaved portion 2 is beveled as is illustrated at 3 and the edge further provides a means for supporting the head of the dog when the animal is resting on the mat.

The chenille or porous dog mat is saturated with an insecticide suitable for exterminating insects, it being understood of course that the insecticide is of such a nature as to be non-odorous thus enabling the animal or dog to occupy the mat without the animal knowing that the mat is saturated with an insecticide. The purpose of saturating the dog mat with an insecticide provides a means for exterminating the insects carried by the body of the animal such as fleas while the animal is resting on the mat, the body of the animal being supported by the concaved portion 2 and the head of the animal resting on the ledge or edge 3.

The provision of a dog mat of the above mentioned character, not only affords a means for preventing a dog from lying on clothes or bedding in a house, the mat forming a bed for the animal. Furthermore, the animal may sleep comfortably on the mat with its head supported slightly above the body. The insecticide will at all times be effective in exterminating the insects carried by the body of the animal.

While I have shown the preferred embodiment of my invention, it is to be understood that various changes in the shape, size, and arrangement of parts may be resorted to without departing from the spirit of the invention and the scope of the appended claims.

Having thus described the invention, what I claim is:—

1. An article of manufacture comprising a mat upon which an animal is adapted to rest, the upper surface thereof being concaved for its greater area, the edge formed therearound being beveled and providing a head rest for the animal.

2. An insect exterminating mat adapted to function as a bed for animals comprising a pad formed of compressible porous material, capable of being saturated with an insecticide, said pad being formed in its top with a depression for reception of the body of the animal, and having a peripheral raised head rest bounding said depression.

3. As a new article of manufacture, a mat adapted to function as a bed for an animal, said mat being in the form of a substantially ovate pad formed of a fabric of the compressible and porous nature, said fabric being formulated to provide a depression in the top occupying the greater portion of the area thereof, and adapted for reception of the body of the animal, and a raised marginal portion, serving as an endless headrest, the latter having a rounded top to afford comfort for the animal.

In testimony whereof I affix my signature.

ARTHUR G. BURT.